(12) United States Patent
Thang (10) Patent No.: US 8,612,440 B2
(45) Date of Patent: Dec. 17, 2013

(54) COMPUTER BASED METHOD AND SYSTEM FOR GENERATING CUSTOM DYNAMIC TEMPLATES

(75) Inventor: Richie Hoa Thang, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 338 days.

(21) Appl. No.: 12/764,341

(22) Filed: Apr. 21, 2010

(65) Prior Publication Data
US 2011/0264711 A1 Oct. 27, 2011

(51) Int. Cl.
*G06F 17/30* (2006.01)
(52) U.S. Cl.
USPC ............. 707/736; 707/758; 715/764; 358/1.1
(58) Field of Classification Search
USPC .......................................... 715/748, 764–769
See application file for complete search history.

(56) References Cited

U.S. PATENT DOCUMENTS

| | | | |
|---|---|---|---|
| 6,003,011 A | 12/1999 | Sarin et al. | |
| 7,991,317 B2 * | 8/2011 | Kato et al. | 399/81 |
| 8,204,851 B2 * | 6/2012 | Rong et al. | 707/608 |
| 8,208,159 B2 * | 6/2012 | Knodt et al. | 358/1.15 |
| 8,327,362 B2 * | 12/2012 | Yagi | 718/100 |
| 2002/0152254 A1 * | 10/2002 | Teng | 709/100 |
| 2006/0005140 A1 * | 1/2006 | Crew et al. | 715/760 |
| 2006/0080616 A1 * | 4/2006 | Vogel et al. | 715/769 |
| 2008/0046833 A1 * | 2/2008 | Patz et al. | 715/769 |
| 2010/0185973 A1 * | 7/2010 | Ali et al. | 715/781 |
| 2010/0275222 A1 * | 10/2010 | Wallace | 719/331 |

* cited by examiner

*Primary Examiner* — Fred I Ehichioya
*Assistant Examiner* — Michelle Owyang
(74) *Attorney, Agent, or Firm* — Simpson & Simpson, PLLC (57) ABSTRACT

A method for a dynamically configurable imaging process, including: inputting, using a graphical user interface for at least one first specially programmed computer, computer instructions for executing at least one image processing task; creating template type information using the computer instructions and a first processor for the first computer, the template type information in a database; retrieving, using a second processor for at least one second specially programmed computer, the template type information from the database; inserting, using the second processor, the template type information into a service flow for a first imaging process; and executing, using the second processor, the template type information such that the computer instructions for the at least one image processing task are implemented as part of the service flow for the first imaging process.

13 Claims, 8 Drawing Sheets

COMPUTER BASED METHOD AND SYSTEM FOR GENERATING CUSTOM DYNAMIC TEMPLATES

TECHNICAL FIELD

The present disclosure relates to a dynamically configurable imaging process and method, in particular, to a dynamically configurable imaging process and method using template type information including computer instructions for executing imaging tasks.

BACKGROUND

Known imaging processes include service flows with work steps including one or more services directed to executing specific imaging related tasks. In general, work steps and services are created by developers with specialized programming skills. However, the service flows are implemented by end users who typically do not have the specialized programming skills of the developers. Further, work steps and services are not designed to be configurable once implements in a service flow by an end user. Therefore, end users are not able to manipulate work steps and services to optimize service flows.

SUMMARY

According to aspects illustrated herein, there is provided a method for a dynamically configurable imaging process, including: inputting, using a graphical user interface for at least one first specially programmed computer, computer instructions for executing at least one image processing task; creating template type information using the computer instructions and a first processor for the at least one first specially programmed computer; storing, using the first processor, the template type information in a database; retrieving, using a second processor for at least one second specially programmed computer, the template type information from the database; inserting, using the second processor, the template type information into a service flow for a first imaging process; and executing, using the second processor, the template type information such that the computer instructions for the at least one image processing task are implemented as part of the service flow for the first imaging process.

According to aspects illustrated herein, there is provided a computer-implemented method for a dynamically configurable imaging process, including: inputting, using a graphical user interface for at least one first specially programmed computer, computer instructions for executing at least one image processing task; creating template type information using the computer instructions and a first processor for the at least one first specially programmed computer; storing, using the first processor, the template type information in a database; retrieving, using a second processor for the at least one second specially programmed computer, the template type information from the database; selecting, using the second processor, a service flow for a first imaging process, the service flow including a work step with a service; inserting, using the second processor, the template type information in the service for the work step; and, executing, using the second processor, the work step and the template type information such that the computer instructions for executing at least one image processing task are executed as part of the work step for the service flow for the first imaging process According to aspects illustrated herein, there is provided a computer-based system for a dynamically configurable imaging process, including a graphical user interface for at least one first specially programmed computer for inputting a work step, the work step including computer instructions for executing at least one image processing task; and a first processor for the at least one first specially programmed computer. The first processor is for: creating template type information using the computer instructions; and storing the template type information in a database. The system includes a second processor for at least one second specially programmed computer for: retrieving the template type information from the database; inserting the template type information into a service flow for a first imaging process; and executing the template type information such that the computer instructions for the at least one image processing task are implemented as part of the service flow for the first imaging process.

According to aspects illustrated herein, there is provided a dynamically configurable imaging process, including: a graphical user interface for at least one first specially programmed computer for inputting computer instructions for executing at least one image processing task; and a first processor for the at least one first specially programmed computer for: creating template type information using the computer instructions; and storing, using the first processor, the template type information in a database. The system includes a second processor for at least one second specially programmed computer for: retrieving the template type information from the database; selecting a service flow for a first imaging process, the service flow including a work step with a service; inserting the template type information in the service for the work step; and executing the work step and the template type information such that the computer instructions for executing at least one image processing task are executed as part of the work step for the service flow for the first imaging process.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Unless defined otherwise, all technical and scientific terms used herein have the same meaning as commonly understood to one of ordinary skill in the art to which these embodiments belong. As used herein, the following terms are intended to be broadly construed as follows:

Service Flow for an Imaging Process:

A particular set of activities, structured as a sequence of individual steps that perform specific image processing tasks, or specific processing tasks related to or supporting image processing tasks. For example, one service flow may be defined as: Scan the input documents, enhance the images, perform OCR and store the respective documents, then index them and extract the invoice numbers as metadata associated with every document. Another service flow may be defined as: Scan the images, perform some type of intelligent document processing, extract the metadata and store only the metadata. A service flow (also referred to as a work flow)

represents a set of work activities that specifies the individual work steps that must be completed and the sequence in which they are to be performed.

Execution of Service Flow:

A service flow is executed in stages. The different work steps constituting a service flow can be regarded as vertices of a directed acyclical graph, so there is an implicit sequential ordering among the work steps in the service flow. For example, the activities in the work steps can be performed in the order in which the work steps appear in a flow definition. A service flow has both an activity structure and a content structure. The structure can be configured when defining the service flow. The activity structure is a description of the work steps comprising the flow, together with their associated activities (and services).

Processing Flow:

Processing of client documents may involve different steps. One example of a basic general structure of the processing flow is as follows:

1. Several preliminary processing steps, when the document is received and pre-processed.
2. A job object representing the service flow is created during check-in.
3. A document is scanned and imported in electronic form into the system.
4. The scanned document is analyzed and metadata may be added to it (indexing). The quality of the document may also be assessed. At this stage, some operator intervention is may be necessary.
5. Some additional formatting and structure conversion may be performed (pre-delivery processing), so that the final document in electronic form is structured in accordance with requirements.

Flow Definition:

A representation of a service flow and related work steps, for example, as a block diagram or flow chart. The flow definition includes as order or sequence for the related work steps.

Template Type Information (TTI):

A predetermined set of instructions relevant to workflow and/or an imaging process in a predetermined format.

Work Step:

A service flow (work process) includes one or more work steps or queues. A work step of the work process defines the set of activities that must be performed as part of the work step. It should be understood that a service flow for an imaging process may include any operation known in the art related to processing of images, whether directly involving an imaging process, supporting an image process, or using the results of an imaging process. Example work steps include, but are not limited to: scanning a document, enhancing an image, performing optical character recognition (OCR), operating upon a document or data from a document, physically manipulating a document, storing data or metadata from a document, preparing a document for processing, assembling or disassembling documents, indexing documents, and distributing document data.

Information regarding service flow for an imaging process is described in "XPIM Overview" updated Sep. 26, 2007, copywrite 2007 by Xerox Corporation. All Rights Reserved. The disclosure of which is incorporated herein by reference in its entirety.

Figure 1:
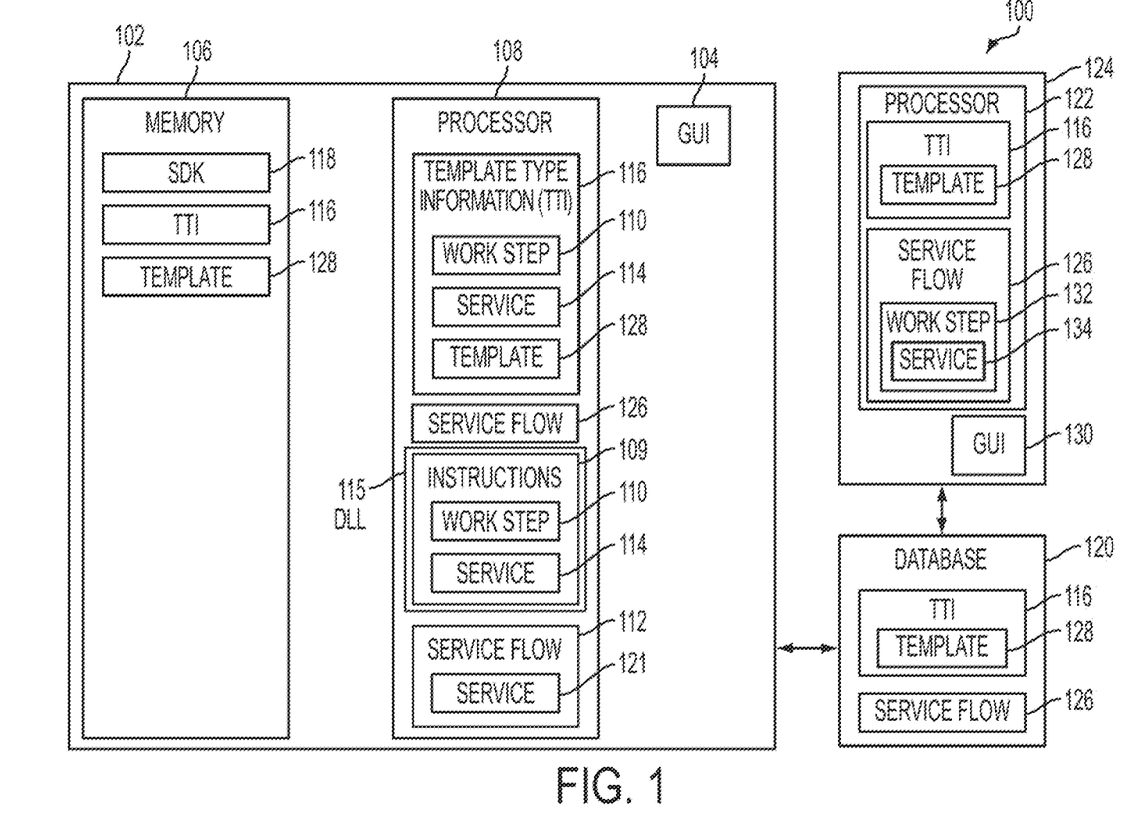
FIG. 1 is a block diagram of a computer-based system for a dynamically configurable imaging process.

FIG. 1 is a block diagram of computer-based system 100 for a dynamically configurable imaging process. System 100 includes at least one first specially programmed computer 102 including graphical user interface (GUI) 104, memory element 106, and processor 108. In one embodiment, the GUI is for accepting instructions 109 for executing at least one image processing task. In one embodiment, the instructions are applicable to work step 110. Work step 110 is usable in a service flow for an imaging process. In one embodiment, the instructions are applicable to one or more services 114 to be added to a work step already included in a service flow for an imaging process. In one embodiment, the instructions are included in dynamic-link library (DLL) file 115. It should be understood that the instructions can be the same or different for step 110 and services 114. The processor is for creating template type information (TTI), or TTI grouping, 116, including work step 110 or services 114, from the instructions, for example, instructions 109. In one embodiment, the processor also uses software development kit (SDK) 118. In one embodiment, kit 118 is stored in the memory unit.

In one embodiment, the processor stores the TTI in transactional database 120. In one embodiment, the processor stores the TTI in the memory element and in transactional database 120. The transactional database is accessible to any number of individual computers or computer systems, both remote and local.

Work step 110 can be any work step known in the art, and can include any services, or imaging tasks, known in the art, including, but are not limited to: scanning a document, enhancing an image, performing optical character recognition (OCR), operating upon a document or data from a document, physically manipulating a document, storing data or metadata from a document, preparing a document for processing, assembling or disassembling documents, indexing documents, and distributing document data. Service 114 can be any service or imaging task known in the art, including, but not limited those listed above.

TTI 116 includes the computer instructions for executing image processing tasks that were included in work step 110 or service 114. That is, the TTI includes and enables the functionality of the work step or service. In one embodiment, the TTI is inserted in service flow 112 and the instructions originally included in work step 110 or service 114 can be implemented as part of the service flow either as a new work step or as part of the existing work step to which service 114 was directed. For example, the TTI is inserted in a service, for example, service 121, in service flow 112.

Advantageously, processor 108 or a processor for another specially programmed computer, such as processor 122 for computer 124, can retrieve a copy of the TTI, for example, from database 120, and use the TTI in a service flow, such as service flow 126, for an imaging process, or can use the TTI as a service for an existing work step in service flow 126. In both cases, the computer instructions included in the TTI are implemented in service flow 126. For example, the functionality of work step 110 or service 114 is available for use in other imaging processes, for example, service flows, via the TTI, as further described below. Thus, a work step or service for a work step can be added to a service flow without the necessity of a developer re-writing the instructions and configurations included in the work step or service. Further, end users who do not have the technical ability to write services are able to access and use the configurable functionality of the TTI.

In one embodiment, one or more templates 128 are included in the TTI. For example, the TTI includes respective computer instructions for executing image processing tasks for a plurality of services, for example, from work step 110 or services 114. A copy of the TTI can be retrieved by processor 108 or 124, and the file can be displayed on GUI 104 or GUI 130 for computer 124. In one embodiment, the templates are default templates included in the DLL by the developer. In one embodiment, a user/developer can generate templates comprising sub-groupings of the services included in the TTI after the TTI is extracted from the DLL. For example, if the TTI includes services A-D, one template could include services A and B and another template could includes service B-D. In one embodiment, templates 128 are stored in database 120. In one embodiment, templates 128 are stored in database 120 and the local memory element, for example, element 106.

Advantageously, much as described above for the TTI, processor 108 or processor 122 can obtain a copy of the templates and use the templates as respective services in one or more work steps for a service flow, such as service flow 112 or 126, for an imaging process. The respective computer instructions included in the selected templates are implemented in the service flow. That is, the respective portions of the functionality of work step 110 or service 114 included in the templates are available for use in other imaging processes, for example, service flows, via the template, as further described below.

In one embodiment, individual services in a TTI or template can be modified by a user, for example, parameters or variables associated with a service can be modified. For example, a copy of a template 128 can be obtained and displayed on a GUI. Details regarding services in the template can then be displayed on the GUI. For example, a service may be directed to removing speckles from an image and a parameter regarding size of a speckle to be removed can be modified by a user.

The following describes the use of a TTI or template already stored in the transactional database. The following is directed to computer 102; however, it should be understood that the discussion also is applicable to other specially programmed computers such as computer 124. Using GUI 104, a user creates a service flow, for example, service flow 126, including a work step, such as work step 132, for an imaging process. The user also selects at least one service for the work step, for example, service 134, and a TTI, such as TTI 116, for use with the service. In this example, the TTI includes at least one template, such as template 128. The template includes computer instruction for executing at least one respective image processing task. The user then selects a template from the at least one template for use in the service.

In one case, the user elects to execute the service flow with the service including the selected template as stored in the database. That is, the user does not modify the template. In another case, the user elects to modify the selected template, for example, modifying at least one respective image processing task for the template, using the GUI. Then, the processor executes the modified computer instructions for the template as part of the service for the service flow.

Although the exemplary discussion above is directed to two computers, it should be understood that any number of computers, both local and remote, can perform the functions described above and, in particular, be connected to database 120. Thus, database 120 is a repository of dynamically created TTIs and templates and associated collections of functionality available to any number of systems in communication with the database. Users can set up local, production site specific repositories of TTIs and templates with the capability of importing, exporting, and sharing TTIs and templates including technical configuration data, such as imaging scripts, configuration parameters, and service definitions, via access to the transactional database.

The following is an example of a process for implementing a TTI.

Figure 2:
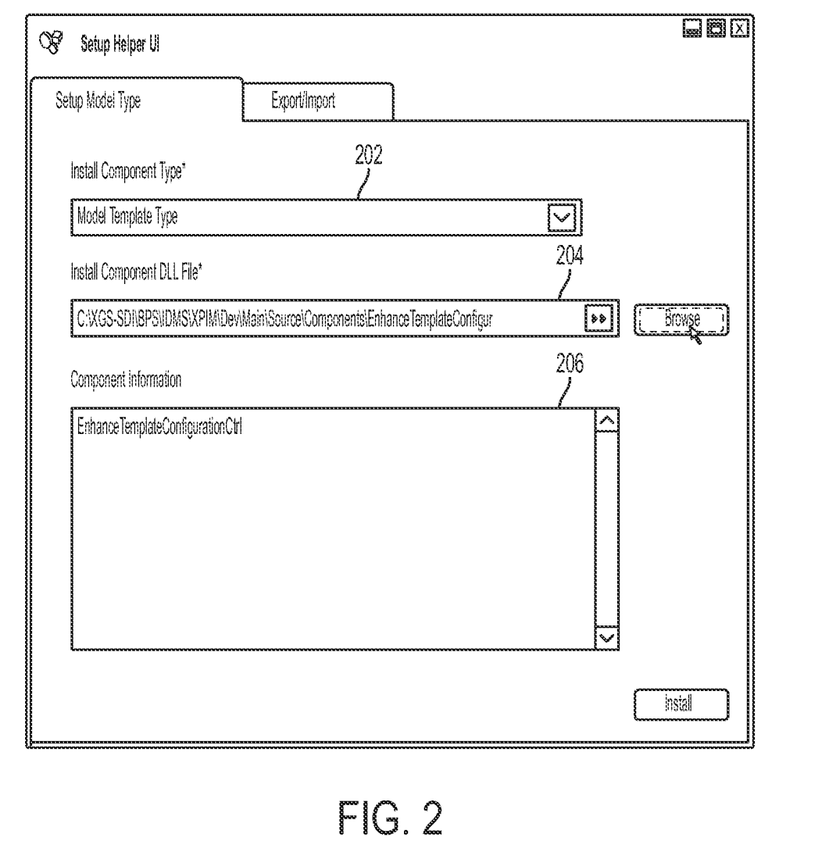
FIGS. 2 through 8 are photographs of respective screens illustrating example operation of a computer-based system for a dynamically configurable imaging process.

FIG. 2 is a photograph of a screen illustrating example operation of a computer-based system for a dynamically configurable imaging process. In particular, FIG. 2 illustrates deployment of template type information, for example, TTI 116, into system 100. A developer has generated a respective file, for example, a DLL file, including a work step or service, for example, work step 110 or service 114, as is known in the art and stored the file. To generate the screen shown in FIG. 2, a user has logged into system 100 and selected the "Setup Model Type" button. The user has selected "Model Template Type" from menu 202. Using the "Browse" button, the user has selected the DLL file noted above for display in field 204. Information, such as a descriptor, regarding the DLL file is displayed in field 206. To deploy TTI from the DLL file to the system, for example, to store the TTI in database 120, the user selects the "Install" button. That is, when the "Install" button is clicked, a processor, for example, processor 108, extracts the relevant information, for example, computer instructions for executing at least one image processing task, from the DLL selected in FIG. 2 and stores the information, for example, TTI 116, in the database. The TTI is then accessible using an administration application for system 100.

Figure 3:
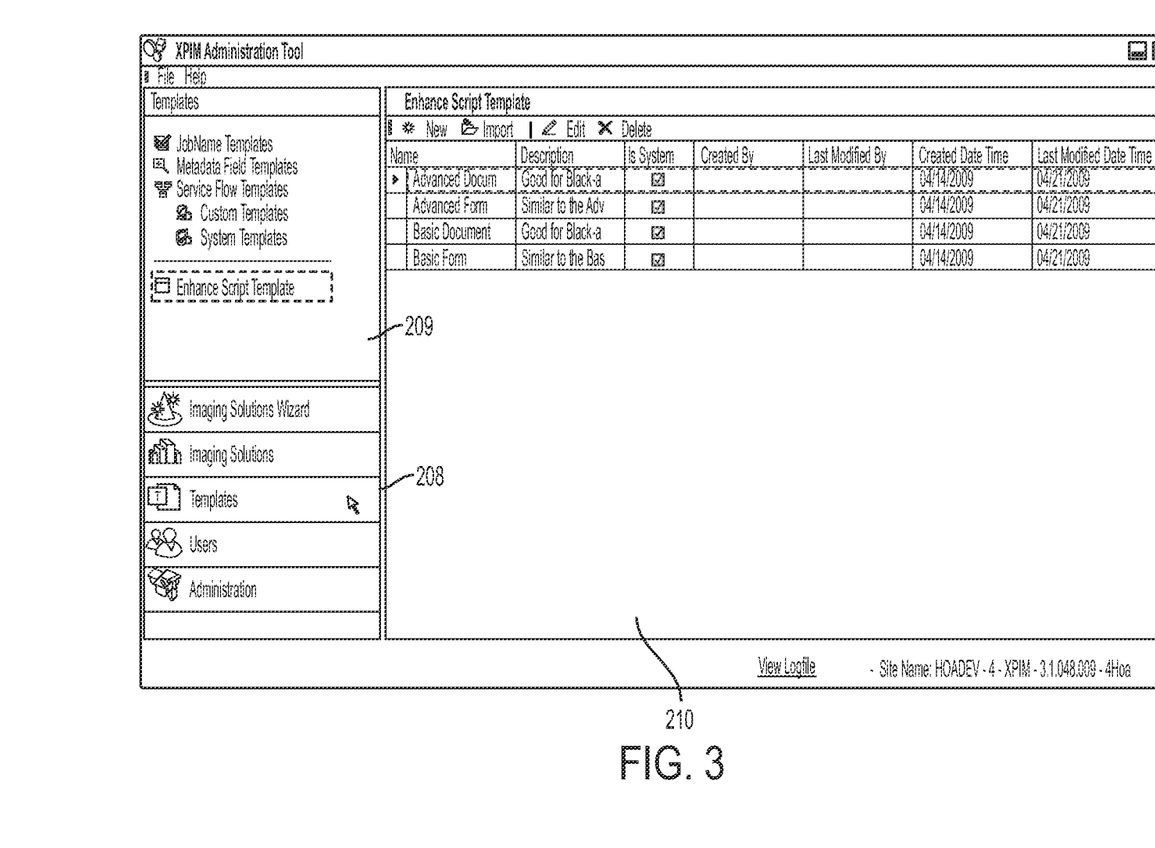

To generate the screen shown in FIG. 3, the user has returned to the administration application, for example, the Administration Tool page, and selected "Templates" from menu 208 to populate field 209 with available TTIs. The user has selected "Enhance Script Template" from field 209 which causes the templates associated with the "Enhance Script Template" to be displayed in field 210. The "Enhance Script Template" was extracted from the DLL in FIG. 2 and stored in a transactional database available to users of the system shown, for example, system 100. From this screen, a user can create a new template, edit an existing template, or delete an existing template. In FIG. 3, four templates are shown in field 210. These four templates were included in the DLL of FIG. 2.

FIGS. 4-8 are photographs of screens illustrating example operation of a computer-based system for creating a template type for use in a service flow for an imaging process. In particular, FIGS. 4-8 illustrate the use of the TTI "Enhance Script Template," deployed in FIG. 2 and displayed in FIG. 3.

Figure 4:
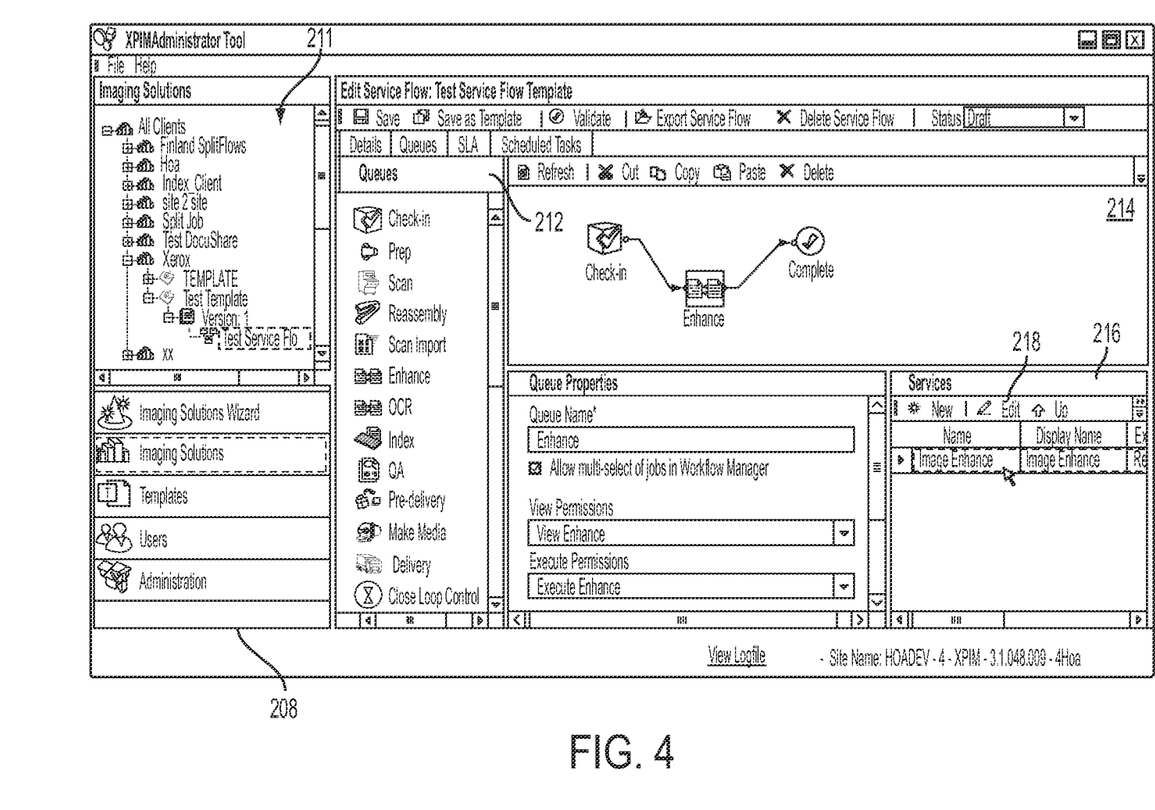

To generate the screen shown in FIG. 4, the user has selected "Imaging Solutions" from menu 208 in FIG. 3, which generates tree 211. From tree 211 the user selects a service flow, in this example, "Test Service Flow." The user then selects from menu 212 the three queues, "Check-in" "Enhance" and "Complete" shown in field 214 to form the service flow. The user has selected the "Enhance" work step and the system shows the default service or services associated with the work step in field 216. In this case, the service is labeled "Image Enhance." The user elects to include the service in "Enhance."

Figure 5:
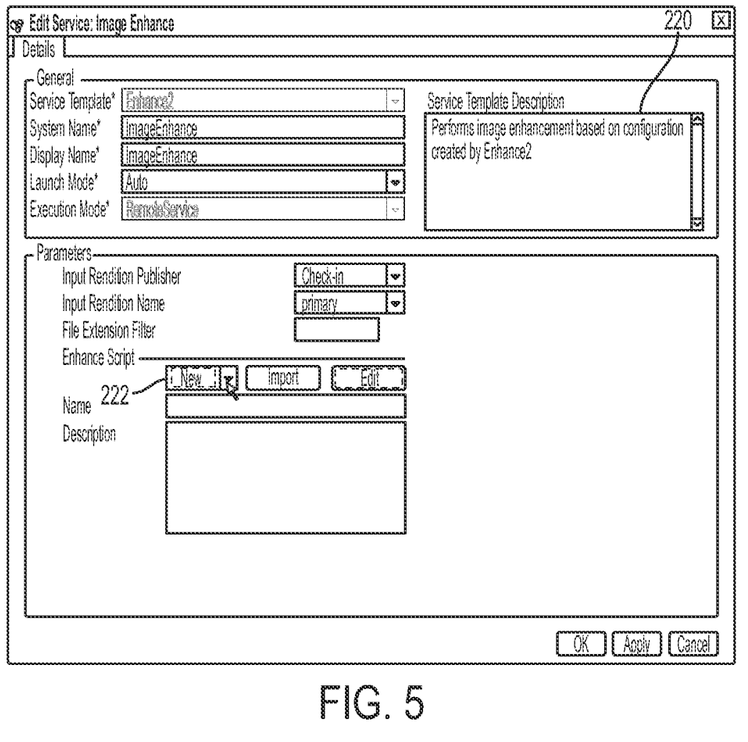

To generate the screen shown in FIG. 5, the user clicked on edit button 218 in FIG. 4. In one embodiment, a description of service "Image Enhance" is provided in field 220.

Figure 6:
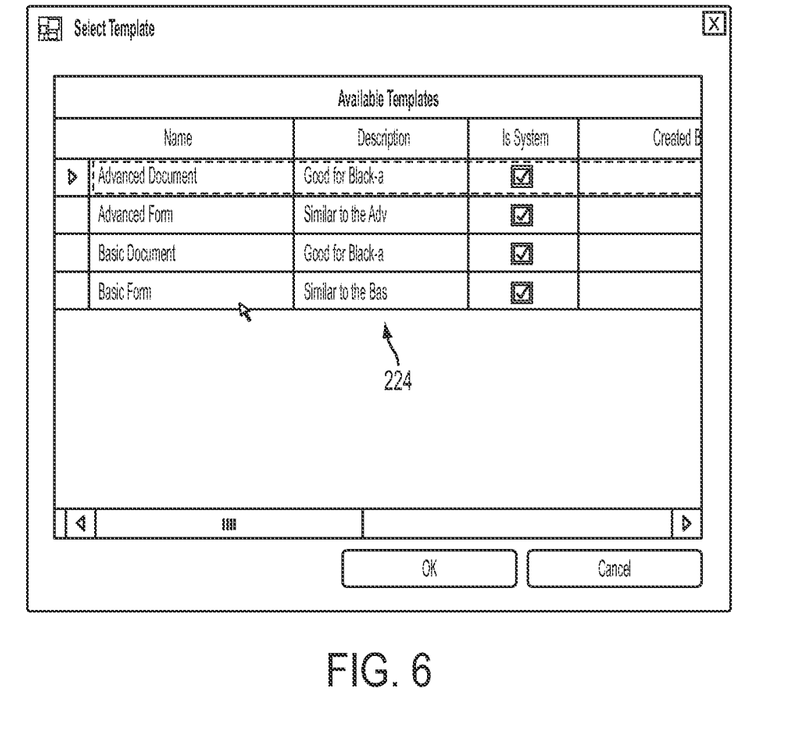

To generate the screen shown in FIG. 6, the user selected "New" button 222 in FIG. 5 and from the resulting pull-down menu selected "New From Template" to operate on existing templates. In one embodiment, for a selected service, system 100, for example, processor 108, selects the TTIs and templates, stored in the database, that are applicable to or usable with the selected service. In this example, the applicable templates for "Image Enhance" are shown in field 224. Another option is to generate a new template from a TTI linked to the "Image Enhance" service using the pull-down menu from button 222.

Figure 7:
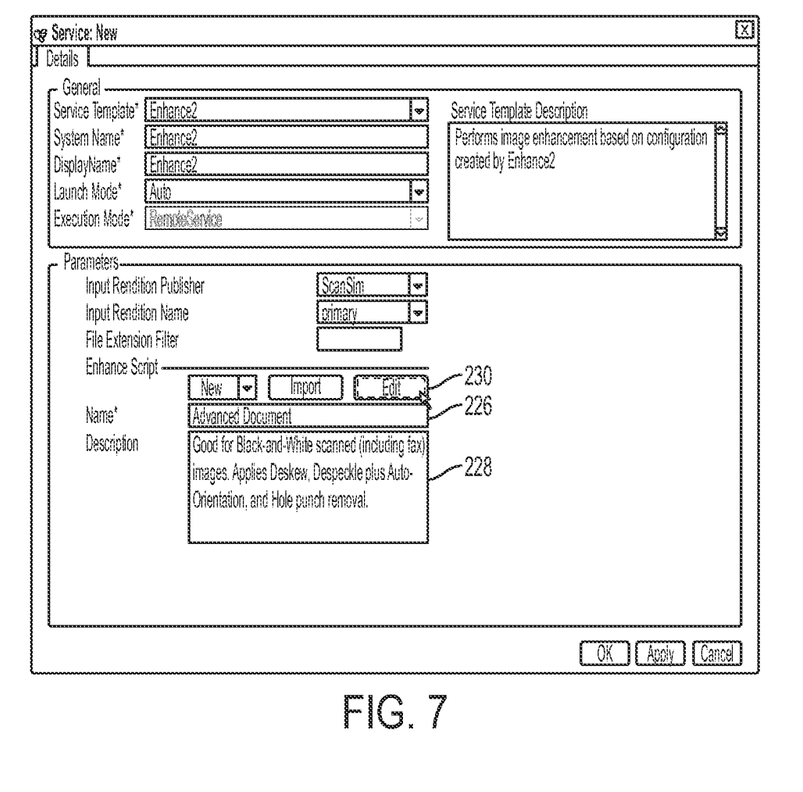

To generate the screen shown in FIG. 7, the user has selected the "Advanced Document" template and clicked on the "OK" button in FIG. 6. The screen in FIG. 7 is similar to the screen for FIG. 5, except that the name and description of the template ("Advanced Document") selected in FIG. 6 are displayed in fields 226 and 228, respectively.

Figure 8:
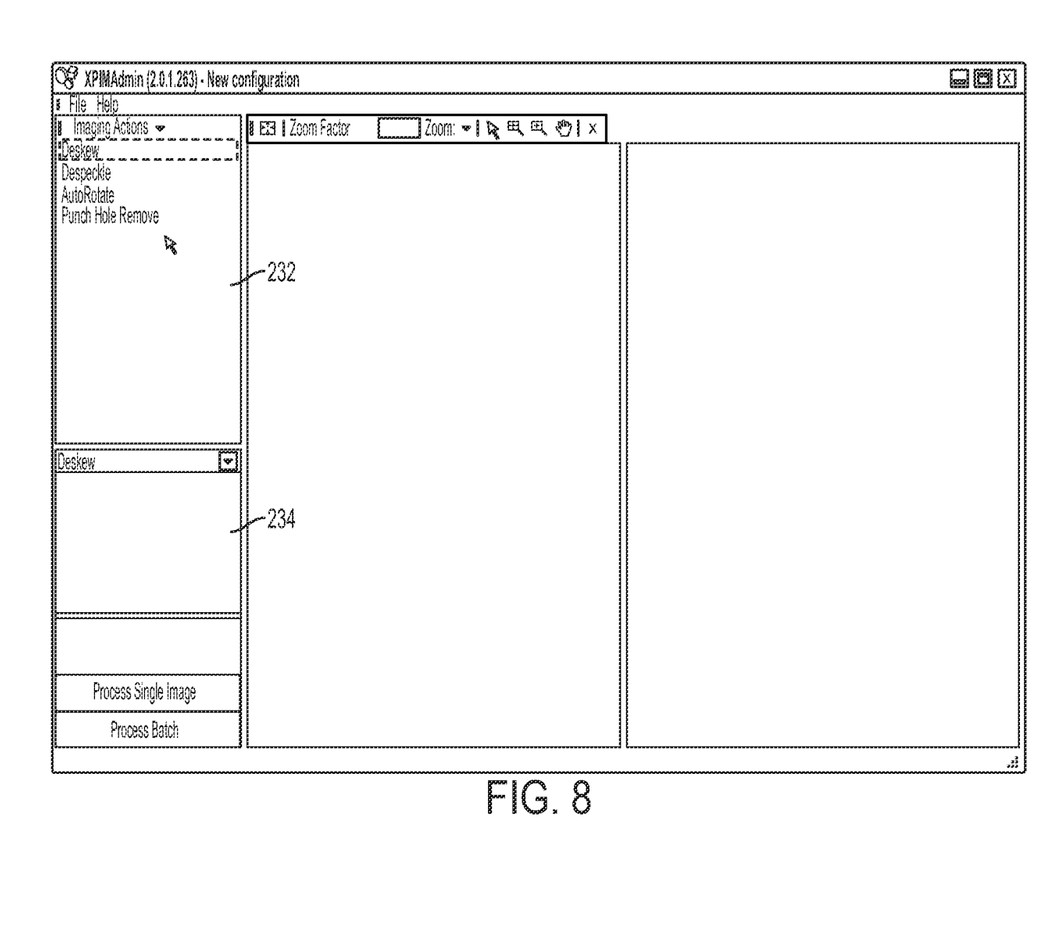

To generate the screen shown in FIG. 8, for example, to operate on the selected template, the user selected "Edit" button 230 in FIG. 7. The tasks ("Imaging Actions") that form template "Advanced Document" are displayed in field 232 in the screen of FIG. 8. The user has selected action "Deskew," which is then displayed below field 232. Commands, parameters, and other elements of "Deskew" can be displayed and modified in field 234.

System 100 enables end users to implement and deploy new TTIs for use with service flows. In one embodiment, system 100 enables end users to easily implement new template types and create an installer to distribute to end users. System 100 also enables the developer to introduce specific securable operations that the system administrator can configure to prohibit unauthorized users from accessing and manipulating TTIs, for example, controlling rights to creating/importing/exporting TTIs. In one embodiment, some or all of the above functionality is implemented using SDK 118.

The administration tool provides a user interface for authorized end users to manage (create, import, export, and edit) TTIs and to implement TTIs in end user service flows. The administration tool also allows user users to select from the available TTIs and templates during a service flow configuration.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A computer-implemented method for a dynamically configurable imaging process, comprising:
   inputting, using a graphical user interface (GUI) for at least one first specially programmed computer, computer instructions included in dynamic link library (DLL) file for executing at least one image processing task, wherein the computer instructions are applicable to work step usable in a service flow for an image process, and the computer instructions are applicable to one or more services added to the work step in the service flow;
   creating first template type information including the work step and the one or more services using the computer instructions and a first processor for the at least one first specially programmed computer, wherein the first template type information is a predetermined set of instructions relevant to the at least one image processing task in a predetermined format, and the first template type information includes a task in the work step for the at least one image processing task and an editable parameters for the task;
   storing, using the first processor, the first template type information in a database;
   retrieving, using a second processor for at least one second specially programmed computer, the first template type information from the database;
   selecting, using the second processor, a service flow for a first imaging process;
   inserting, using the second processor, the first template type information into the service flow for the first imaging process;
   executing, using the second processor, the first template type information inserted into the service flow for the first image process by implementing computer instructions included in the first template type information;
   implementing the service flow for the first imaging process using the inserted first template type information and the second processor;
   selecting, using the second processor, a portion of the computer instructions for executing a plurality of image processing tasks;
   creating, using the second processor, second template type information including the portion of the computer instructions for executing the plurality of image processing tasks, wherein the second template type information is a predetermined set of instructions relevant to the at least one image processing task in a predetermined format, and wherein the second template information includes one or more templates, wherein the one or more templates comprise sub-grouping of services included in the second template type information;
   selecting, using the second processor, a service flow for a second imaging process;
   inserting, using the second processor, the second template type information with selected templates into the service flow for the second imaging process;
   executing, using the second processor, the second template type information inserted in to the service flow for the second image process by implementing computer instructions included in the second template type information; and
   implementing the service flow for the second imaging process using the second template type information and the second processor, wherein the at least one second specially programmed computer is separate from and different from the at least one first specially programmed computer.

2. The method of claim 1 further comprising modifying, using the second processor, the computer instructions for executing the at least one image processing task.

3. The method of claim 1 wherein inserting, using the second processor, the first template type information into the service flow for the first imaging process includes inserting the first template type information into a service for a work step for the service flow for the first imaging process.

4. The method of claim 1 further comprising storing, using the second processor, the second template type information in the database.

5. The method of claim 1 wherein inserting, using the second processor, the second template type information into the service flow for the second imaging process includes inserting the second template type information into a service for a respective work step for the service flow for the second imaging process.

6. A computer-implemented method for a dynamically configurable imaging process, comprising:
   inputting, using a first graphical user interface (GUI) of at least one first specially programmed computer, computer instructions included in dynamic link library (DLL) file for executing at least one image processing task applicable to a work step in a service flow for an imaging process, the work step defining a set of activities that must be performed as part of the work step, and the computer instructions are applicable to one or more services added to the work step;

creating a plurality of template type information (TTI) using the computer instructions and a first processor of the at least one first specially programmed computer, wherein each TTI in the plurality of TTI is a respective predetermined set of instructions for executing at least one respective imaging processing task in a respective predetermined format, and wherein each TTI includes one or more work steps and one or more templates, wherein the one or more templates comprise sub-grouping of services and tasks;

storing, using the first processor, the plurality of template type information in a database;

displaying, via a second processor and graphical user interface (GUI) of a second specially programmed computer, a listing of each TTI in the plurality of TTI;

receiving, via the GUI and the second processor, a first input selecting a first TTI from the displayed listing of plurality of TTI;

displaying, in response to the first input and via the second processor and the GUI, a listing of templates comprising sub-grouping of services and service flow included in the first TTI, wherein each template in the list of templates is a respective predetermined set of instructions for executing at least one respective imaging processing task in a respective predetermined format;

receiving, via the GUI and the second processor, second input selecting a service flow from the displayed list of templates for a first imaging process, wherein the selected work flow includes sequence of work steps;

displaying, in response to the second input and via the second processor and the GUI, a representation of the selected service flow and the sequence of work steps;

receiving, via the GUI and the second processor, a third input selecting one of work step from the sequence of work steps and selecting a service in the selected work step;

displaying, in response to the third input and via the second processor and the GUI, a listing of templates in the plurality of TTI usable with selected service, wherein each template in the listing of templates is a respective predetermined set of instructions for executing at least one respective imaging processing task in a respective predetermined format;

receiving, via the GUI and the second processor, a fourth input selecting a template from the listing of templates in the TTI usable with the selected service;

displaying, in response to the fourth input and via the second processor and the GUI, a representation of the selected template from the listing of templates in the TTI usable with the selected service second;

receiving, via the GUI and the second processor, a fifth input to edit selected template from the listing of templates in the TTI usable with the selected service;

displaying, in response to the fifth input and via the second processor and the GUI, a representation of a task included in the selected template from the listing of templates in the TTI usable with the selected service for modification;

receiving, via the GUI and the second processor, a sixth input including a modification to the task; and, executing, using the second processor, the selected service flow, including the modified task, for the first imaging process.

7. The method of claim 6 further comprising modifying, using the second processor, the computer instructions for executing at least one image processing task.

8. The method of claim 6 wherein:
creating the plurality of template type information includes creating a plurality of template type information groupings;

storing the plurality of template type information in a database includes storing the plurality of template type information groupings in the database; and, the service flow for the first imaging process includes a plurality of work steps with respective services, the method further comprising:

determining for each respective service, using the second processor, which of the template type information groupings in the plurality of template type information groupings are usable with said each respective service.

9. A computer-based system for a dynamically configurable imaging process, comprising:

a graphical user interface (GUI) of at least one first specially programmed computer for inputting a work step, the work step including computer instructions included in dynamic link library (DLL) file for executing a plurality of image processing tasks, wherein the computer instructions are applicable to one or more services added to the work step in the service flow;

a first processor of the at least one first specially programmed computer is programmed to:

create first template type information including the work step and the one or more services using the computer instructions, wherein the first template type information is a predetermined set of instructions relevant to the plurality of image processing tasks in a predetermined format, and the first template type information includes a task in the work step for the at least one image processing task and an editable parameters for the task; and store the first template type information in a database;

a second processor of the at least one second specially programmed computer is programmed to:

retrieve the first template type information from the database;

select a service flow for a first imaging process;

insert the first template type information into the service flow for the first imaging process;

select a portion of the computer instructions for executing the plurality of image processing tasks;

create, using the portion of the computer instructions, second template type information including the portion of the computer instructions for executing the plurality of image processing tasks, wherein the second template type information is a predetermined set of instructions relevant to the plurality of image processing tasks in a predetermined format, and wherein the second template information includes one or more templates, wherein the one or more templates comprise sub-grouping of services included in the second template type information;

select a service flow for a second imaging process;

insert the second template type information with selected templates into the service flow for the second imaging process;

execute the first template type information inserted into the service flow for the first image process by implementing computer instructions included in the first template type information;

implement the service flow for the first imaging process using the inserted first template type information and the second processor;

execute the second template type information inserted in to the service flow for the second image process by implementing computer instructions included in the second template type information; and, implement the service flow for the second imaging process using the second template type information and the second processor, wherein the at least one second specially programmed computer is separate from and different from the at least one first specially programmed computer.

10. The system of claim 9 wherein inserting the template type information into the service flow for the first imaging process includes inserting the template type information into a service for a work step for the service flow for the first imaging process.

11. The system of claim 9 further comprising storing, using the second processor, the second template type information in the database.

12. The system of claim 9 wherein inserting the second template type information into the service flow for the second imaging process includes inserting the second template information into a service for a respective work step for the service flow for the second imaging process.

13. A computer-based system for a dynamically configurable imaging process, comprising:
 a first specially programmed computer including a first processor and a first graphical user interface (GUI), wherein the first processor is programmed to:
 accept, using the first GUI, a first input including a work step, the work step including computer instructions included in dynamic link library (DLL) file for executing a plurality of image processing tasks, wherein the computer instructions are applicable to one or more services added to the work step in the service flow;
 create a plurality of template type information (TTI) using the computer instructions, wherein each TTI in the plurality of TTI is a respective predetermined set of instructions for executing at least one respective imaging processing task in a respective predetermined format, and wherein each TTI includes one or more work steps and one or more templates, wherein the one or more templates comprise sub-grouping of services and tasks; and,
 store the plurality of TTI in a database;
 a second specially programmed computer including a second processor and a second GUI, wherein the first processor is programmed to:
 display, via the (GUI), a listing of each TTI in the plurality of TTI;
 receive, via the (GUI), a first input selecting a first TTI from the displayed listing of plurality of TTI;
 display, in response to the first input and via the GUI, a listing of templates comprising sub-grouping of services and service flow included in the first TTI, wherein each template in the list of templates is a respective predetermined set of instructions for executing at least one respective imaging processing task in a respective predetermined format;
 receive, via the GUI, second input selecting a service flow from the displayed list of templates for a first imaging process, wherein the selected work flow includes sequence of work steps;
 display, in response to the second input and via the GUI, a representation of the selected service flow and the sequence of work steps;
 receive, via the GUI, a third input selecting one of work step from the sequence of work steps and selecting a service in the selected work step;
 display, in response to the third input and via the GUI, a listing of templates in the plurality of TTI usable with selected service, wherein each template in the listing of templates is a respective predetermined set of instructions for executing at least one respective imaging processing task in a respective predetermined format;
 receive, via the GUI, a fourth input selecting a template from the listing of templates in the TTI usable with the selected service;
 display, in response to the fourth input and via the GUI, a representation of the selected template from the listing of templates in the TTI usable with the selected service second;
 receive, via the GUI, a fifth input to edit selected template from the listing of templates in the TTI usable with the selected service;
 display, in response to the fifth input and via the GUI, a representation of a task included in the selected template from the listing of templates in the TTI usable with the selected service for modification;
 receive, via the GUI, a sixth input including a modification to the task; and,
 execute the selected service flow, including the modified task, for the first imaging process.

* * * * *